United States Patent
Naini

(10) Patent No.: US 9,123,061 B2
(45) Date of Patent: Sep. 1, 2015

(54) SYSTEM AND METHOD FOR PERSONALIZED DYNAMIC WEB CONTENT BASED ON PHOTOGRAPHIC DATA

(75) Inventor: Roya Naini, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 459 days.

(21) Appl. No.: 12/661,835

(22) Filed: Mar. 24, 2010

(65) Prior Publication Data

US 2011/0238503 A1    Sep. 29, 2011

(51) Int. Cl.
    *G06Q 30/02* (2012.01)
(52) U.S. Cl.
    CPC ............ *G06Q 30/0269* (2013.01); *G06Q 30/02* (2013.01)
(58) Field of Classification Search
    CPC .................................................. G06Q 30/0271
    USPC .................... 705/14.66, 14; 382/103
    See application file for complete search history.

(56) References Cited

U.S. PATENT DOCUMENTS

| 2002/0186867 A1 | 12/2002 | Gutta |
| 2003/0063102 A1* | 4/2003 | Rubinstenn et al. .......... 345/619 |
| 2003/0093794 A1* | 5/2003 | Thomas et al. ................. 725/46 |
| 2007/0188626 A1* | 8/2007 | Squilla et al. ............. 348/222.1 |
| 2008/0002892 A1* | 1/2008 | Jelonek et al. ................ 382/224 |
| 2008/0059218 A1 | 3/2008 | Sottery |
| 2008/0306749 A1* | 12/2008 | Fredlund et al. .................. 705/1 |
| 2009/0097712 A1* | 4/2009 | Harris ........................... 382/115 |
| 2009/0150330 A1* | 6/2009 | Gobeyn et al. .................... 707/1 |
| 2009/0171783 A1* | 7/2009 | Raju ................................ 705/14 |
| 2009/0297045 A1* | 12/2009 | Poetker et al. ................ 382/224 |
| 2010/0161409 A1* | 6/2010 | Ryu et al. ................... 705/14.43 |
| 2011/0072047 A1* | 3/2011 | Wang et al. .................... 707/776 |

FOREIGN PATENT DOCUMENTS

WO    WO 02/43391    5/2002

OTHER PUBLICATIONS

Jhilmil Jain, et al "Color Match: An Imaging Based Mobile Cosmetics Advisory Service" <http://infoscience.epfl.ch/record/128727/files/JainBBCDHLSS08.pdf>.

* cited by examiner

*Primary Examiner* — Eric Netzloff
(74) *Attorney, Agent, or Firm* — Farjami & Farjami LLP

(57) ABSTRACT

There is provided a system and method for providing personalized dynamic online content based on photographic data. There is provided a method comprising receiving photographic data of a user, determining user preferences by analyzing the photographic data, generating personalized dynamic online content using the user preferences and a profile associated with the user, and providing the personalized dynamic online content for output on a display of the user. In particular, the photographic data may be analyzed to identify creative properties, such as favored brands and characters. Through the immediate user preference feedback provided by the photographic content, a higher degree of optimal targeted content can be provided to the user without requiring conventional burdensome procedures such as manually completed user surveys or lengthy periods of behavioral monitoring.

18 Claims, 3 Drawing Sheets

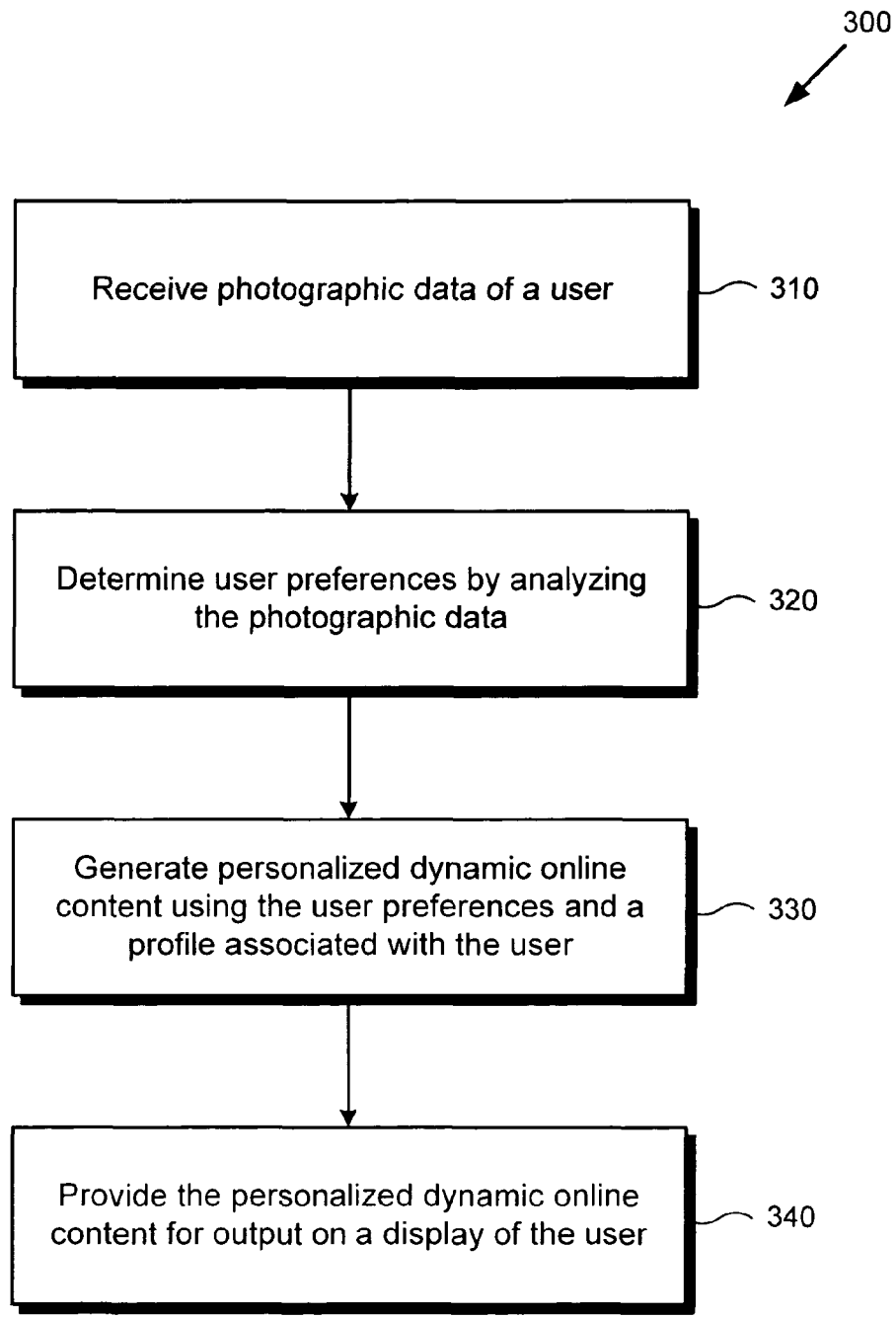

SYSTEM AND METHOD FOR PERSONALIZED DYNAMIC WEB CONTENT BASED ON PHOTOGRAPHIC DATA

BACKGROUND OF THE INVENTION

1. Field of the Invention

The present invention relates generally to targeted online content. More particularly, the present invention relates to using photographic data for determining targeted online content.

2. Background Art

To improve user retention, engagement, and visitor loyalty over the Internet, it is important to provide users with dynamic online content that is tailored to each user's specific interests. By providing personalized or targeted dynamic online content, including advertising, that is more relevant to the interests of each user, users may be more inclined to remain on site, patronize advertising sponsors, and make return visits in the future.

Conventionally, to provide targeted online content such as web content, profiles are built for each user using information solicited directly or indirectly from users. For example, users may participate voluntarily in questionnaires or demographic surveys, or may provide profile data indirectly through their web browsing history or behaviors. However, such information gathering efforts are often burdensome, as users must take the time and effort to build their user profiles. Moreover, this process often requires a long term period of data monitoring before providing usable results, leading to less than optimal targeted content in the early stages of profile building.

Accordingly, there is a need to overcome the drawbacks and deficiencies in the art by providing a way to generate personalized dynamic online content in an optimal and expedited manner.

SUMMARY OF THE INVENTION

There are provided systems and methods for providing personalized dynamic online content based on photographic data, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart describing the steps, according to one embodiment of the present invention, by which personalized dynamic online content based on photographic data may be provided to a user for output on a display.

DETAILED DESCRIPTION OF THE INVENTION

The present application is directed to a system and method for providing personalized dynamic online content based on photographic data. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
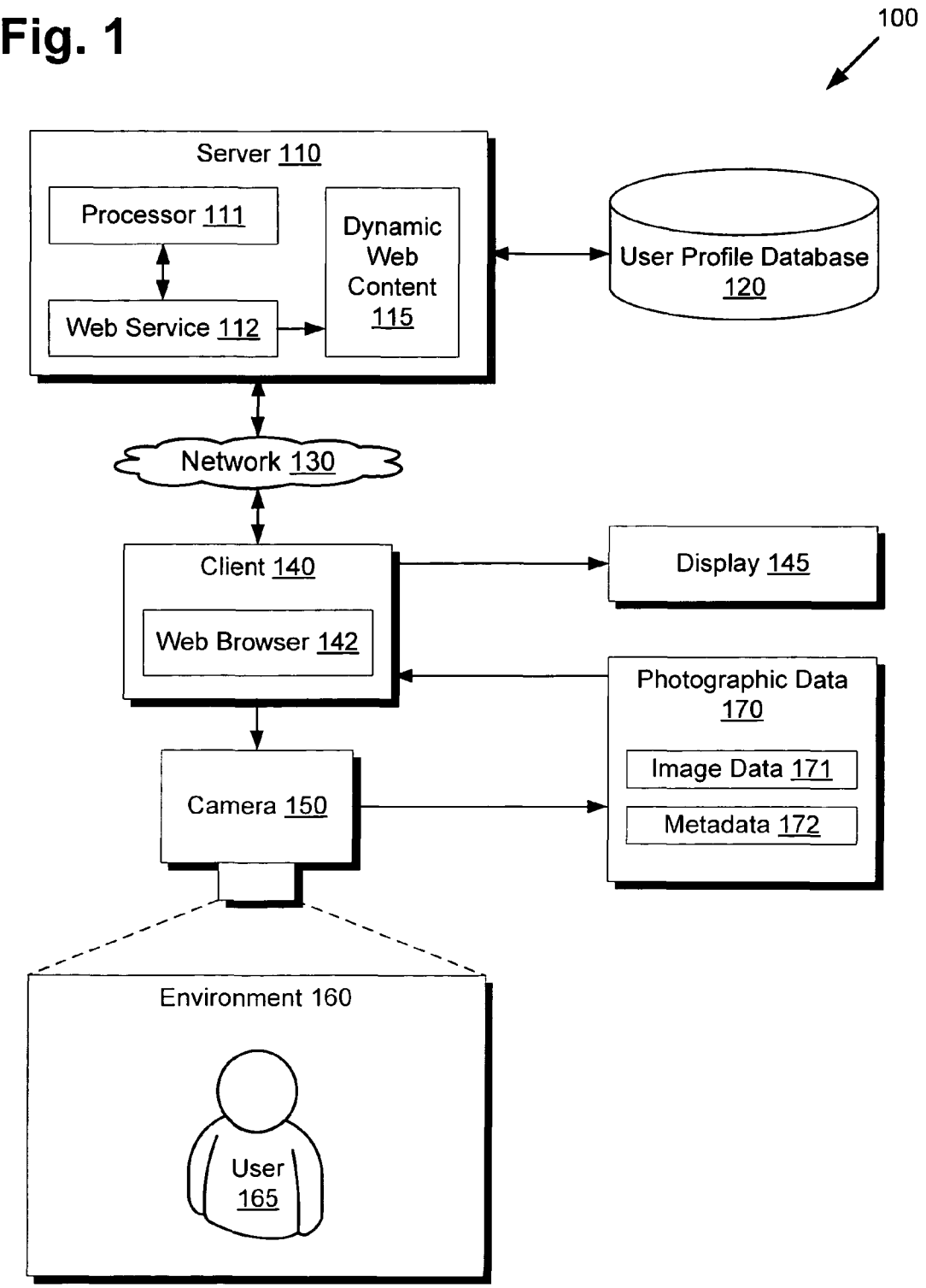
FIG. 1 presents a diagram of a system for providing personalized dynamic online content based on photographic data, according to one embodiment of the present invention.

FIG. 1 presents a diagram of a system for providing personalized dynamic online content based on photographic data, according to one embodiment of the present invention. Diagram 100 of FIG. 1 includes server 110, user profile database 120, network 130, client 140, display 145, camera 150, environment 160 and photographic data 170. Server 110 includes processor 111, web service 112, and dynamic web content 115. Client 140 includes web browser 142. Environment 160 includes user 165. Photographic data 170 include image data 171 and may also include metadata 172. While only a single server and client are shown for simplicity, alternative embodiments may use several servers and support several clients.

In one embodiment of the invention, user 165 may access server 110 over network 130 using client 140. For example, server 110 may comprise a web server executing web service 112 on processor 111, network 130 may comprise a public network such as the Internet, and client 140 may comprise any Internet access device such as a personal computer, a mobile phone, a laptop or tablet computer, a video game console, or another device. Web browser 142 may then access web service 112, which may provide data for a website to be rendered on display 145. Client 140 may be identified as a return visitor using user profile database 120, which may track and collect user information provided through voluntary user registration, browser cookies, scripting, third-party tracking data, and other methods as known in the art.

While the example network shown in FIG. 1 focuses on the serving and retrieval of web based content, the invention is applicable to any type of online content. Thus, for example, proprietary gaming networks for video game consoles including Xbox LIVE or PlayStation Network, standalone social networking applications such as applets or clients for Facebook or Twitter, proprietary messaging networks such as Microsoft Messenger or Yahoo Messenger, and any other non-web or non-HTTP (Hypertext Transfer Protocol) based online protocols may also be adapted to provide targeted or dynamic online content using photographic data. Thus, while the examples may focus on the delivery of web content over web-based protocols, it should be understood that the invention is broadly applicable for any type of online content using any network protocol. Conventionally, personalization, behavior, history and preference data concerning client 140 would be collected in user profile database 120 over an extended period of time to ascertain the interests and preferences of user 165. In the beginning stages of such data collection, user profile database 120 will have little or no information concerning user 165. Thus, when dynamic web content 115 is generated for client 140, server 110 may be forced to make uneducated guesses concerning user 165 that may result in less than optimal content targeting, which may result in user 165 losing interest with web service 112. To avoid this state of affairs, there needs to be a faster and easier way to determine the preferences of user 165 so that targeted content can be immediately relevant for user 165.

Fortunately, the broad availability of low cost cameras has enabled manufacturers to embed cameras as a standard feature in many devices. Thus, there is a high probability that a typical client 140 may have access to camera 150, which may comprise, for example, an integrated camera or an external web camera. With the permission of user 165, camera 150 may be directed to take a picture of environment 160, including user 165, which may then be converted into photographic data 170 for sending back to web service 112. Although a single image data 171 is shown which corresponds to a single photograph, in alternative embodiments, photographic data 170 may include several images, a video stream, images obtained from the video stream, and other related data such as an audio stream. As shown in FIG. 1, besides image data 171 comprising the actual pixels of the captured image, metadata 172 may also be included as part of photographic data 170. Metadata 172 may, for example, include a timestamp, or date and time, when the photo was taken, camera parameters such as camera model and lighting conditions, location or geographic parameters such as coordinates provided by GPS or geographic tags, and other data.

Once photographic data 170 is received by web service 112, analysis may be carried out on image data 171 and metadata 172 in conjunction with any data available in user profile database 120 to generate dynamic web content 115 tailored for user 165. Dynamic web content 115 may then be passed back to web browser 142 of client 140 for rendering on display 145, where the content may be viewed by user 165. Although not shown in FIG. 1, client 140 may also be connected to an audio output device, such as speakers or headphones, to support multimedia web content or accessibility features such as speech readers. Alternative embodiments may also support other methods of sensory feedback, such as haptic feedback.

Figure 2:
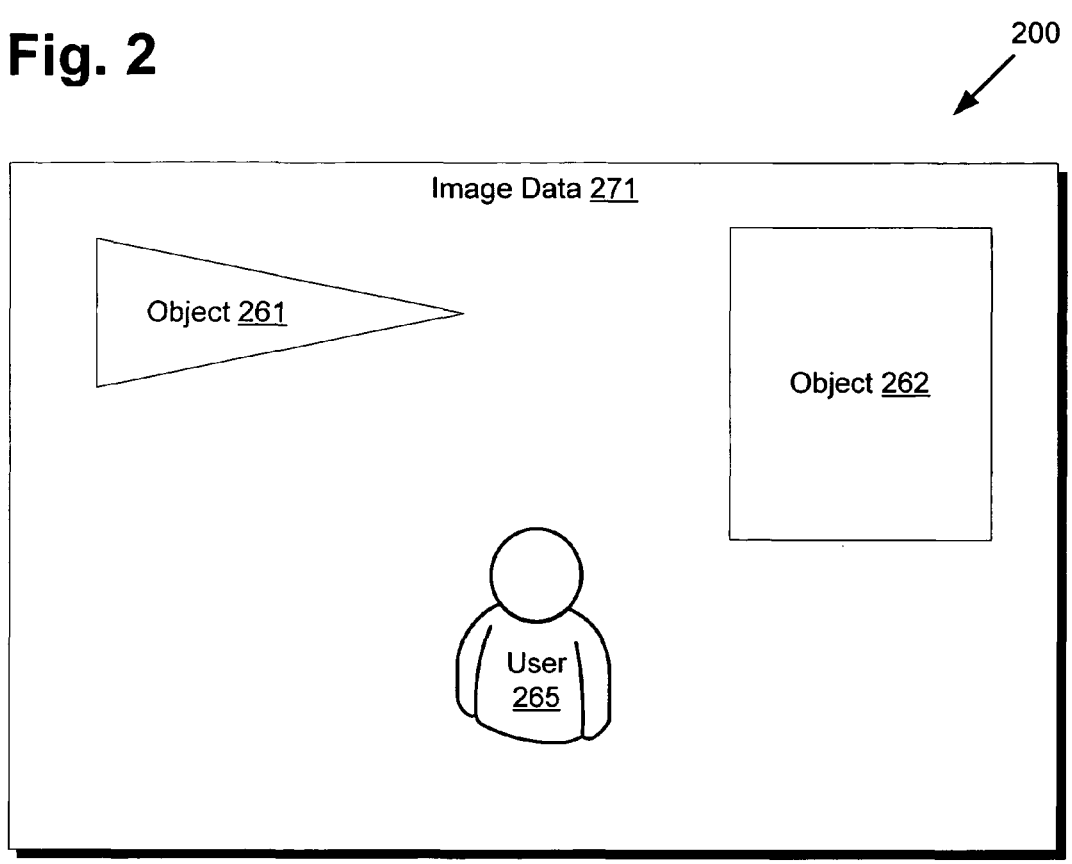
FIG. 2 presents a diagram of photographic data for analysis to provide personalized dynamic online content, according to one embodiment of the present invention.

Moving to FIG. 2, FIG. 2 presents a diagram of photographic data for analysis to provide personalized dynamic online content, according to one embodiment of the present invention. Diagram 200 of FIG. 2 includes image data 271, which includes object 261, object 262, and user 265. Image data 271 corresponds to image data 171 from FIG. 1, and user 265 corresponds to user 165 from FIG. 1.

As shown in image data 271, besides user 265, other objects in the environment are visible, including object 261 and object 262. For example, object 261 may comprise a pennant of a particular sports team, and object 262 may comprise a poster for a particular movie. User 265 may have particular physical features, such as having orange dyed hair, and detectable clothing styles such as a branded T-shirt. Other detectable objects may include, for example, stuffed toys, dolls, figures, and other character goods, clothing articles and accessories such as caps, sweaters, bags and jewelry, and decorations such as calendars, paintings and photographs. These details may be discerned from the raw pixels of image data 271 using image recognition techniques as known in the art. Thus, creative properties such as logos, brands, characters, and other distinctive designs or marks can be recognized and associated with the user. These details may then be used, in conjunction with any profile data associated with the user, to generate personalized dynamic online content. For example, article content, page layout, advertising, or other content may be customized to be relevant to the sports team of object 261, the movie of object 262, the brand of the T-shirt worn by user 265, or to statistical demographic data associated with users that dye their hair orange. In this manner, content can be quickly and optimally targeted towards the likely interests of user 265. In exchange, user 265 only needs to exert the minimal effort of providing permission for a photograph to be taken. In some embodiments, user 265 may provide permission for a previously taken photograph to be used, for example pictures viewable on an associated user account for a social networking site.

Moving to FIG. 3, FIG. 3 shows a flowchart describing the steps, according to one embodiment of the present invention, by which personalized dynamic online content based on photographic data may be provided to a user for output on a display. Certain details and features have been left out of flowchart 300 that are apparent to a person of ordinary skill in the art. For example, a step may comprise one or more sub-steps or may involve specialized equipment or materials, as known in the art. While steps 310 through 340 indicated in flowchart 300 are sufficient to describe one embodiment of the present invention, other embodiments of the invention may utilize steps different from those shown in flowchart 300.

Referring to step 310 of flowchart 300 in FIG. 3 and diagram 100 of FIG. 1, step 310 of flowchart 300 comprises processor 111 of server 110 receiving photographic data 170 of user 165. As previously described, user 165 may be prompted, via web browser 142, to provide permission for camera 150 to take a picture of environment 160 including user 165. Alternatively, an already existing picture such as a previously uploaded picture or a picture uploaded to a social networking site may be used. In this case, processor 111 may prompt user 165 to provide new photographic data if existing available pictures are beyond a certain threshold age, as very old photographic data may lose relevance. In either case, photographic data 170 is provided back to server 110 via network 130 for further processing by web server 112 executing on processor 111. As previously described, while photographic data 170 shown in FIG. 1 only contains a single image data 171, alternative embodiments may include several images, video content, or audio content. Moreover, as described below in step 320, photographic data 170 may be analyzed with other available photographic data, such as previously submitted photographic data stored in user profile database 120.

Referring to step 320 of flowchart 300 in FIG. 3 and diagram 100 of FIG. 1, step 320 of flowchart 300 comprises processor 111 of server 110 determining user preferences of user 165 by analyzing photographic data 170 received in step 310. As previously described, in some embodiments, metadata 172 may be analyzed to help determine the user preferences. For example, a timestamp in metadata 172 may be relevant for weighing the relevance of the particular photograph, with one algorithm for example prioritizing photographs with more recent timestamps. Additionally, photographs with timestamps in close temporal proximity might be analyzed as a group, which may for example provide redundant image data allowing a higher confidence of image recognition. In a similar manner, geographic data or location data within metadata 172 may also be used for the user preference analysis. For example, the city or postal code of the user may be used in conjunction with demographic databases to account for regional trends. Also, photographs in close geographic proximity may be analyzed as a group for ease of image recognition.

Of course, the primary focus of determining the user preferences may be the actual image data 171. Examining the corresponding image data 271 of FIG. 2, user 265, if shown in the photograph, may be analyzed for physical features, clothing, and accessories, as previously described. Besides user 265, the surrounding environment may also be analyzed. For example, the layout of the environment may provide some indications of the user's lifestyle, hobbies, and sense of style. Additionally, objects with recognizable creative properties may be identified, such as object 261, a pennant with a sports team logo, and object 262, a poster with actors from a movie. All these data points may be analyzed to extrapolate likely preferences for user 265, such as a favorite sports team, a favorite movie genre, a favorite character or actor, a favored brand of clothing or fashion style, and other preferences. In embodiments including video or audio streams, similar analysis may be applied to the video and audio streams.

Additionally, any profile information concerning user 165 in user profile database 120 may be used to further influence the determination of user preferences. For example, past behavior concerning user 165, such as web browsing history or partner e-commerce transactions, may be used to help determine user interests. User profile database 120 may also contain any previously submitted photographic data or other user generated content as well as prior user preference analysis results, allowing processor 111 to track evolving and time sensitive user preference trends. This data may be mined and analyzed in various ways to provide highly targeted content. For example, photographic data in user profile database 120 may be grouped according to season, and photographs having winter timestamps may be analyzed to determine user preferences for winter fashions, allowing advertisers to more effectively market seasonal apparel. Of course, user 165 may also develop different tastes and preferences as time progresses. If data from the more recent photographic data 170 conflicts with older data in the user profile of user profile database 120, weighting algorithms and other techniques may be used to assign confidence in specific data points and thereby resolve conflicts. For example, data points that are more recent in time may be assigned a higher weighting.

Referring to step 330 of flowchart 300 in FIG. 3 and diagram 100 of FIG. 1, step 330 of flowchart 300 comprises processor 111 of server 110 generating dynamic web content 115 using the user preferences determined in step 320 and a profile associated with user 165 in user profile database 120. The scope of dynamic web content 115 may range from a simple advertisement to the complete layout and design of an entire website and anything in-between. For example, if web service 112 hosts a sports related website, then dynamic web content 115 might simply comprise a text advertisement related to the favorite sports team detected from the photographic data, such as a solicitation to buy branded merchandise, which is then combined with more general web content. In another example, if web service 112 hosts a movie related website, then dynamic web content 115 may include trailers for movies featuring the detected favorite character or actor.

Besides the above described smaller segments of content, dynamic web content 115 may also comprise a complete website that is "re-skinned" or changed thematically to match to the particular sports team identified in object 261. Thus, for example, website primary colors may match the primary colors of the sports team, banners and logos may feature logos and players from the sports team, and featured content articles may focus on the recent activity of the sports team. Thus, processor 111 may be flexibly configured to generate as much dynamic web content 115 as desired, which may then be combined with more general web content if necessary.

Referring to step 340 of flowchart 300 in FIG. 3 and diagram 100 of FIG. 1, step 340 of flowchart 300 comprises processor 111 of server 110 providing dynamic web content 115 generated in step 330 to web browser 142 of client 140 for rendering and output on display 145 of user 165. Thus, the website content is now viewable on display 145, and user 165 can browse through the targeted content. In this manner, user 165 can readily access relevant and interesting web content by submitting photographic data. User 165 is thereby freed from the conventional requirements of manually filling out lengthy questionnaires or surveys to receive optimal targeted content.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for execution by a processor of a server providing a web service by serving online content to a browser of a client computer over a network, the server having a memory storing one or more previously obtained images each having a corresponding time stamp, the method comprising:
   receiving, by the processor, a client request for the web service from the browser of the client computer to receive the online content;
   sending, by the processor, a server request to the client computer to take a first image using a camera of the client computer, in response to the client request for the web service to receive the online content, wherein the first image is taken by the camera in response to the server request sent in response to the client request;
   receiving, by the processor, the first image including photographic data associated with the first image in response to the server request, the first image showing a user of the client computer and a surrounding environment of the user obtained by the camera of the client computer, the photographic data including image data and metadata, wherein the metadata includes a time stamp for the first image;
   weighting, by the processor, the first image and the one or more previously obtained images based on the time stamp for the first image and each time stamp corresponding to the one or more previously obtained images;
   determining, by the processor, user preferences by applying the weighting to analyzing both the user and the surrounding environment of the user shown in the first image and the one or more previously obtained images;
   personalizing, by the processor, the online content to generate a personalized online content, using the user preferences determined by the analyzing of both the user and the surrounding environment of the user shown in the first image; and
   serving, by the processor, the personalized online content to the browser of the client computer in response to the client request for the web service.

2. The method of claim 1, wherein the first image is obtained from a video stream of the camera of the client computer.

3. The method of claim 1, wherein the weighting assigns a higher weight to more recent images.

4. The method of claim 3, wherein the metadata includes camera parameters associated with the photographic data.

5. The method of claim 1, wherein the determining of the user preferences includes analyzing the photographic data to recognize a creative property.

6. The method of claim 1, wherein the determining of the user preferences includes analyzing physical features of the user within the photographic data.

7. The method of claim 1, wherein the personalized online content includes a website having a layout and design related to the user preferences.

8. The method of claim 1, wherein the personalized online content includes advertising content related to the user preferences.

9. A server for providing web service by serving online content to a browser of a client computer over a network, the server comprising:
  a memory storing one or more previously obtained images each having a corresponding time stamp; and
  a processor configured to:
    receive a client request for the web service from the browser of the client computer to receive the online content;
    send a server request to the client computer to take a first image using a camera of the client computer, in response to the client request for the web service to receive the online content, wherein the first image is taken by the camera in response to the server request sent in response to the client request;
    receive the first image including photographic data associated with the first image in response to the server request, the first image showing a user of the client computer and a surrounding environment of the user obtained by the camera of the client computer, the photographic data including image data and metadata, wherein the metadata includes a time stamp for the first image;
    weight the first image and the one or more previously obtained images based on the time stamp for the first image and each time stamp corresponding to the one or more previously obtained images;
    determine user preferences by applying the weighting to analyzing both the user and the surrounding environment of the user shown in the first image and the one or more previously obtained images;
    personalize the online content to generate a personalized online content, using the user preferences determined by the analyzing of both the user and the surrounding environment of the user shown in the first image; and
    serve the personalized online content to the browser of the client computer in response to the client request for the web service.

10. The server of claim 9, wherein the first image is obtained from a video stream of the camera of the client computer.

11. The server of claim 9, wherein the weighting assigns a higher weight to more recent images.

12. The server of claim 11, wherein the metadata includes camera parameters associated with the photographic data.

13. The server of claim 9, wherein the processor is further configured to determine the user preferences by analyzing the photographic data to recognize a creative property.

14. The server of claim 9, wherein the processor is further configured to determine the user preferences by analyzing physical features of the user within the photographic data.

15. The server of claim 9, wherein the processor is further configured to provide the personalized online content by including a website having a layout and design related to the user preferences.

16. The server of claim 9, wherein the processor is further configured to provide the personalized online content by including advertising content related to the user preferences.

17. The method of claim 1, wherein the user preferences are used to generate a dynamic user profile database for generating the personalized online content.

18. The server of claim 9, wherein the user preferences are used to generate a dynamic user profile database for generating the personalized online content.

* * * * *